H. T. INGHRAM.
SEAT MOUNTING FOR AGRICULTURAL IMPLEMENTS.
APPLICATION FILED MAR. 12, 1910.
982,068.
Patented Jan. 17, 1911.
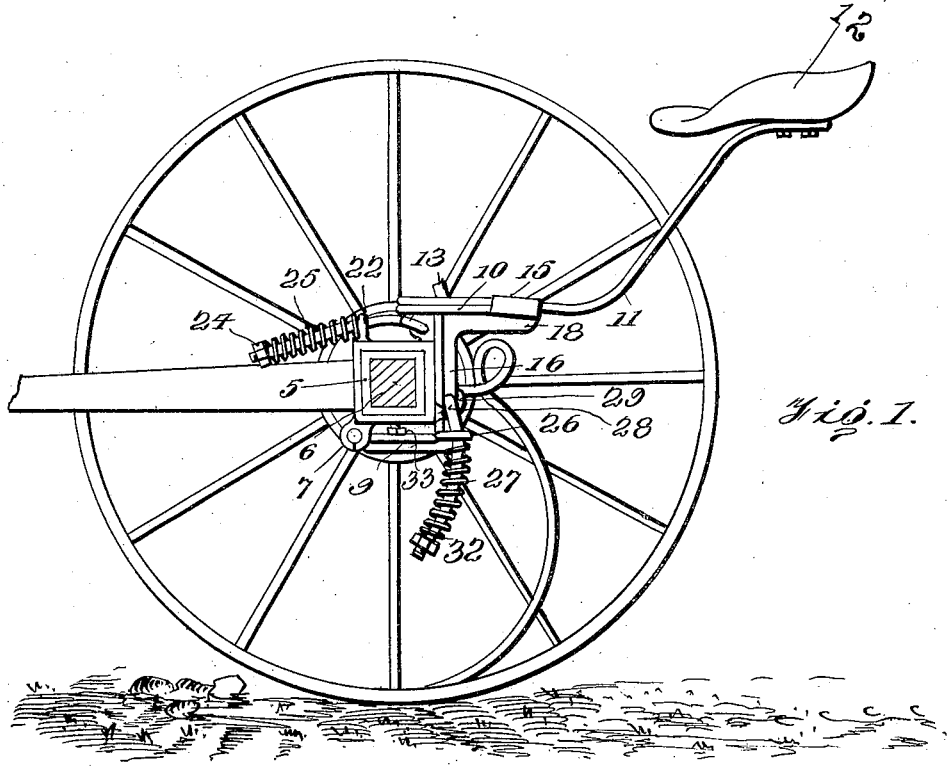
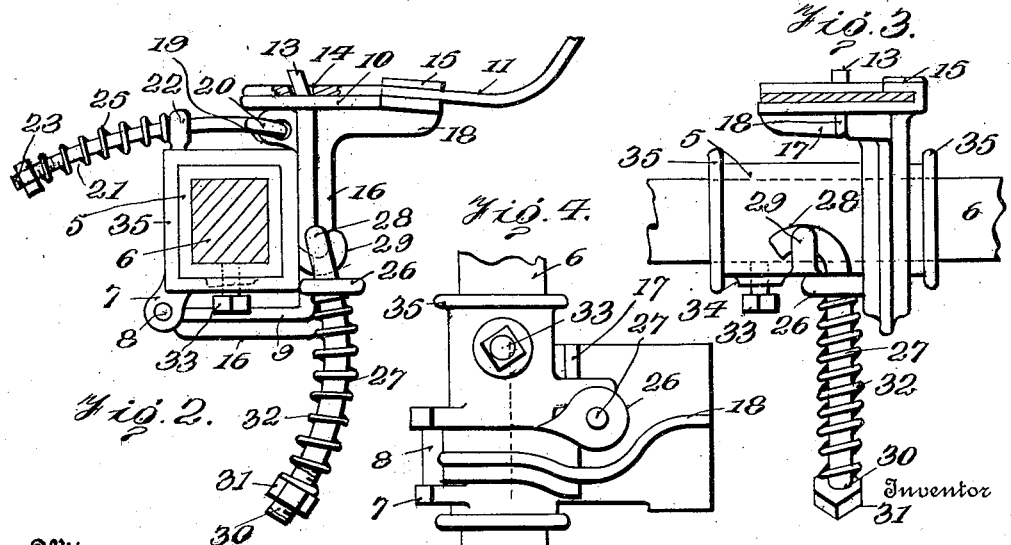

UNITED STATES PATENT OFFICE.

HOWARD T. INGHRAM, OF FAIRFIELD, IOWA.

SEAT-MOUNTING FOR AGRICULTURAL IMPLEMENTS.

982,068. Specification of Letters Patent. Patented Jan. 17, 1911.

Application filed March 12, 1910. Serial No. 548,889.

*To all whom it may concern:*

Be it known that I, HOWARD T. INGHRAM, citizen of the United States, residing at Fairfield, in the county of Jefferson and State of Iowa, have invented certain new and useful Improvements in Seat-Mountings for Agricultural Implements, of which the following is a specification.

This invention relates to shock absorbers for riding cultivators, harrows and the like and has for its object to provide means for yieldably supporting the driver's seat on the cultivator frame, thereby to absorb any shock or jar imparted to the cultivator when the latter is traveling over rough, uneven ground, or strikes an obstruction in the path of travel.

A further object is to provide a shock absorber capable of being quickly attached to any type of riding agricultural implement or machine and which will respond instantly to all shocks incident to the operation of the machine, thus insuring comfort to the driver regardless of surface conditions.

A further object is to provide a shock absorber including a tubular member or sleeve for attachment to the axle or other fixed portion of a cultivator frame and having an angular lever pivotally mounted thereon and adapted to receive and support the driver's seat, suitable springs being operatively connected with the lever for yieldably supporting the seat in normal position.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of a shock absorber constructed in accordance with my invention, the same being shown attached to a cultivator; Fig. 2 is an enlarged side elevation partly in section; Fig. 3 is a rear view; Fig. 4 is a bottom plan view.

Corresponding and like parts are referred to in the following description and indicated in all the views of the drawings by the same reference characters.

The device comprises a tubular casting or sleeve 5 adapted to telescope the axle or other fixed portion of a cultivator frame, indicated at 6, said sleeve being provided with spaced depending ears 7 having transversely alined perforations formed therein and constituting bearings for the laterally extending trunnions 8 of an angular lever 9. The short end of the lever 9 extends beneath the sleeve 5, while the long end thereof projects above the top of said sleeve and is provided with an integral horizontally disposed plate 10 adapted to receive and support a strap 11 on which is mounted a driver's seat, indicated at 12.

Projecting vertically from the plate 10 is a centrally disposed forwardly inclined lug 13 which enters an opening 14 formed in the adjacent end of the seat strap 11 and serves to center the strap on the supporting plate 10, there being an overhanging lug 15 projecting vertically from one side of the plate 10 and adapted to bear against the upper edge of the strap 11 to assist in preventing accidental displacement of said strap.

The lever 9 is reinforced and strengthened by the provision of a rib 16, which latter preferably extends the entire length of the bell crank lever and also extends beneath the supporting plate 10. An auxiliary strengthening rib or web 17 is formed on the lever and extends beneath the supporting plate 10 at right angles to the rib 18. Extending laterally from the upper end of the lever 9 is an eye 19 which receives an eye 20 on the adjacent end of a downwardly inclined rod 21, the opposite end of said rod being extended through a guiding eye or loop 22 extending vertically from the top of the sleeve 5 and is provided with terminal threads 23 for engagement with an adjusting nut 24. Interposed between the nut 24 and the guiding eye or loop 22, is a coil spring 25 which serves to yieldably support the long arm of the lever in engagement with the adjacent side of the sleeve 5. The short arm of the lever 9 is extended laterally at the base of said sleeve 5 to form an eye 26 in which is seated a vertically disposed arcuate rod 27. The upper end of the rod 27 is provided with a hooked terminal 28 which engages an ear or projection 29 extending laterally from one side of the sleeve 5, while the lower end of the rod is threaded at 30 for engagement with a correspondingly threaded adjusting nut 31. A coil spring 32 is interposed between the nut 31 and the lower face of the eye 26, thereby to assist in supporting the plate 10 and driver's seat in normal position.

The tubular member or sleeve 5 is retained in position on the axle or other fixed portion 6 of the cultivator frame by means of a set screw 33, which latter extends through a threaded boss 34 formed on the base of the sleeve 5 for engagement with the axle 6. The opposite ends of the sleeve 5 are preferably strengthened by reinforcing ribs 35, which latter entirely surround the opposite ends of the sleeve, as shown. Thus it will be seen that should the cultivator strike a stone or other obstruction in the path of travel, the shock incident to the impact of the cultivator with said obstruction will be received and absorbed by the springs 25 and 32 so as to prevent the shock or jar from being transmitted to the driver's seat. It will here be noted that when the cultivator strikes an obstruction, the lever 9 will have a tendency to swing downwardly on its pivotal axis 8 and against the tension of the spring 25, the eye 26, by engagement with the spring 32 at the same time serving to compress the latter and thus absorb any jar or shock which would otherwise be transmitted to the driver's seat. By rotating the nuts 24 and 31, the tension of the springs 25 and 32 may be regulated at will.

The device is extremely simple in construction and may be attached to any style of cultivator or other riding agricultural machine, without necessitating any change in the construction thereof.

Having thus described the invention, what is claimed as new is:

1. The combination with a support, of a horizontally disposed sleeve adjustable longitudinally of the support, a seat supporting lever pivotally mounted on the sleeve, means operatively connected with the seat supporting lever for yieldably holding the latter in normal position, and means for holding the sleeve in adjusted position on said support.

2. The combination with a support, of a horizontally disposed sleeve adjustable longitudinally of the support, a bent lever pivotally mounted on the sleeve, a seat supporting strap carried by the lever, means operatively connected with said lever for yieldably supporting the strap in normal position, and means for holding the sleeve in adjusted position on the support.

3. The combination with a support, of a sleeve engaging the support, and provided with bearings, a lever having angularly disposed arms, one of which is provided with terminal trunnions journaled in said bearings, a seat supporting strap carried by the lever, and means operatively connected with the arms of the lever for normally and yieldably supporting the latter in engagement with the sleeve.

4. The combination with a support, of a sleeve engaging the support and provided with depending perforated ears, a lever having angularly disposed arms, one of which is provided with laterally extending trunnions journaled in the perforations in the ears, a seat supporting strap carried by one arm of the lever, and means operatively connected with said arms for normally and yieldably supporting the lever against the sleeve.

5. The combination with a support, of a sleeve engaging the support and provided with a guiding eye, a lever pivotally mounted on the sleeve and provided with angularly disposed arms, one of which is formed with a similar eye, a seat supporting strap carried by the lever, a rod secured to one end of the lever and projecting through the eye on the sleeve, a second rod extending through the eye on the lever and engaging the sleeve, and springs carried by the rods for yieldably supporting the seat strap in normal position.

6. The combination with a support, of a sleeve engaging the support and provided with a laterally extending ear, a bent lever pivotally mounted on the bottom of the sleeve, a seat supporting strap carried by the lever, a rod extending through the lever and provided with a hooked terminal for engagement with the ear on the sleeve, a coil spring carried by the rod, a second rod connected with the upper end of the lever, and a coil spring surrounding the last mentioned rod.

7. The combination with a support, of a sleeve engaging the support, a bent lever pivotally mounted on the bottom of the sleeve and having its free end provided with a terminal plate, a pin extending vertically from the plate, a seat supporting strap having an opening formed therein for the reception of the pin, means carried by the plate and bearing against the said supporting strap for holding the latter in position on said plate, and means bearing against the lever for yieldably holding the latter in normal position.

8. The combination with a support, of a sleeve engaging the support, a bent lever pivotally mounted on the sleeve and having its free end provided with a terminal plate having an overhanging lug, an inclined pin projecting from the upper surface of the plate, a seat supporting strap extending beneath the overhanging lug and provided with an opening adapted to receive the pin, and means operatively connected with the lever for yieldably supporting said lever in normal position.

9. The combination with a support, of a sleeve engaging the support, a bent lever pivotally mounted on the bottom of the sleeve and provided with a reinforcing rib, a horizontally disposed plate forming the top of the lever, an eye extending laterally from the pivoted end of the lever, an ear carried by the sleeve, an arcuate rod having one end thereof provided with a hooked terminal engaging the ear and its other end extended through the eye and provided with threads, a clamping nut engaging said threads, a coil spring interposed between the nut and eye, a guiding eye extending vertically from the top of the sleeve, a threaded rod extending through said guiding eye and connected with the free end of the lever, a nut engaging the threads on the last mentioned rod, and a spring interposed between the nut and guiding eye.

10. The combination with a support, of a sleeve telescoping said support and adjustable longitudinally thereof, a bent lever pivotally mounted on the sleeve, a seat supporting strap secured to the free end of the lever, means operatively connected with the lever for yieldably supporting the latter in normal position, and a fastening device extending through the sleeve and engaging the support for securing the sleeve in adjusted position on said support.

11. The combination with a support, of a sleeve detachably secured to the support and provided with an ear, a rod depending from and engaging said ear, a bent lever pivotally mounted on said sleeve, and provided with an eye through which said rod extends, an upstanding guiding eye formed on the sleeve, a seat supporting strap carried by the free end of the lever, a second rod slidably mounted in the guiding eye and operatively connected with the lever, coil springs surrounding the rods and bearing against said eyes, and means for regulating the tension of the springs.

12. The combination with a support, of a sleeve detachably secured to the support, a bent lever pivotally connected with the bottom of the sleeve and extending upwardly on one side of the sleeve, a horizontally disposed plate forming a part of the lever and provided with an upstanding pin and an overhanging lug, a seat supporting strap having an opening formed therein for the reception of said pin and bearing against the overhanging lug, an ear projecting laterally from one side of the sleeve, a guiding eye extending vertically from the top of the sleeve, an arcuate rod having a hooked terminal engaging the ear and provided with terminal threads, an eye extending laterally from the lever for the reception of said rod, a nut engaging the threaded ends of the rod, a coil spring interposed between the eye and nut, a second rod extending through the eye on the sleeve and pivotally connected with the lever, a nut carried by the last mentioned rod, and a coil spring interposed between the nut and eye.

In testimony whereof I affix my signature in presence of two witnesses.

HOWARD T. INGHRAM.

Witnesses:
W. H. PENCE,
JULIUS R. LIPPMAN.